Oct. 16, 1945. J. R. HICKS 2,387,149

MEANS FOR ADJUSTING PROFILES

Filed June 8, 1943

INVENTOR.
JAMES R. HICKS

BY
*Fred C. Schultz*
ATTORNEY.

Patented Oct. 16, 1945

2,387,149

UNITED STATES PATENT OFFICE 2,387,149

MEANS FOR ADJUSTING PROFILES

James R. Hicks, Waterbury, Conn., assignor to The Bristol Company, New Haven, Conn., a corporation of Connecticut Application June 8, 1943, Serial No. 490,031

15 Claims. (Cl. 74—568)

This invention relates to the adjustment of profiles, and more especially to means for precisely adjusting the contour of the periphery of a cam forming a link in the mechanical train of a measuring or controlling system. In many instruments for performing a continuous measurement of a variable magnitude, there exists between the displacement of a magnitude-sensitive element and that of an exhibiting element a relationship which cannot be expressed as a linear law. Again, in instruments of this class, it is sometimes necessary to provide between such elements a linkage which unavoidably distorts the desired relationship law between the same; and in these and similar instances it is frequently found expedient to include in the mechanical train a cam associated with one of said elements and a follower associated with the other of said elements, and by suitably conforming the contour of the peripheral portion engaged by the follower to introduce into the law of the instrument such corrections or compensations as may be desired. An outstanding example of that type of instruments in which the relationship between the responding and exhibiting elements is inherently non-linear is found in flow meters for determining the rate of passage of a fluid through an orifice or a constriction in a conduit. In instruments of this class the response of the primary metering element involves a parabolic law, which cannot be exactly met by any linkwork involving pivoted connections only; and the interposition of compensating means involving a cam element is common practice.

An example of such use of a cam in a direct-acting flow meter of the Venturi type is found in U. S. Letters Patent No. 1,096,883, granted to H. C. Alger May 19, 1914. An example of a similar use of a cam in connection with a weir or flume is shown in "Hydraulic measurements" (a book) by H. Addison (Wiley 1941), page 260.

Applicant's co-pending application Serial No. 461,312, filed October 8, 1942, shows several examples of cams with conformed profiles incorporated in the mechanisms of self-balancing flow meters of the relay type adapted for use with constrictions in closed conduits; and in U. S. Letters Patent No. 1,202,052 granted to G. H. Gibson October 24, 1916, is found a similar example of such a cam forming an element in the mechanism of a self-balancing flow meter of the weir type. The adaptation of a conformed cam to pressure compensation in a displacement meter is illustrated in U. S. Letters Patent No. 1,923,356 granted to J. C. Diehl August 22, 1933.

A further important use in control systems of cams having a conformed profile is found in the "progressive" type of controller in which the setpoint of a controlling instrument is progressively advanced by a timing mechanism in order to cause a controlled magnitude to be varied through a predetermined succession of values over a period of time. An example of the application of such a cam in this class of control is found in U. S. Letters Patent No. 1,430,852 granted to A. Roesch October 3, 1922.

In the use of a cam as an element in a mechanical linkage for measurement or control, it is obvious that accurate operation of the apparatus demands extreme precision in the conformation of the profile engaged by the follower, and that, whenever quantity production methods may be used in the forming of said cams, there will be many instances where the final shaping of the contour will require delicate individual adjustment. Heretofore, it has been customary to effect such adjustments by filing and honing; but it will be apparent that such a method of adjustment cannot be used to increase the radius of an undersized cam, and that, however skilled the mechanic so engaged, the method is tedious, expensive, and subject to severe limitations.

It is an object of this invention to provide for measuring and controlling instruments, wherein but a small amount of force is required to be transmitted through a linkage incorporating a non-linear law, a cam element of which the profile may be readily adjusted.

It is a further object to provide a cam element of the aforesaid nature in which the adjustment may be made in a sense either to increase or to decrease the radius of said cam.

It is a further object to provide a cam element of the aforesaid nature in which said adjustment may be made with micrometer precision.

It is a further object to provide a cam element of the aforesaid nature in which different portions of the contour thereof may be differently adjusted.

It is a further object to provide a cam element of the aforesaid nature in which adjacent portions of the contour shall always be connected by smooth gradients.

It is a further object to provide a cam element of the aforesaid nature in which desired adjustments can be effected in general without removing the element from its mounted position in the instrument with which it is to be used.

It is a further object to facilitate production on a quantity basis by providing a single design of cam element adaptable to use with a number of different primary devices following characteristic laws in which the exponents are only slightly different.

In carrying out the invention, the novel cam member includes an element of a resilient nature and of a more or less tubular form adapted for attachment laterally along its length to a rotatable or oscillatable carrier, said resilient element having associated therewith means whereby it may be deformed to vary its engagement contour with an associated follower.

The nature of the invention, however, will best be understood when described in connection with the accompanying drawing, in which.

Figure 1:
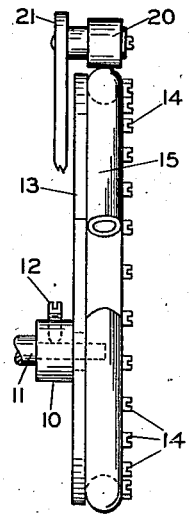
Figs. 1 and 2 are side and front elevations respectively of a radial cam member embodying the principle of the invention.
Figure 2:
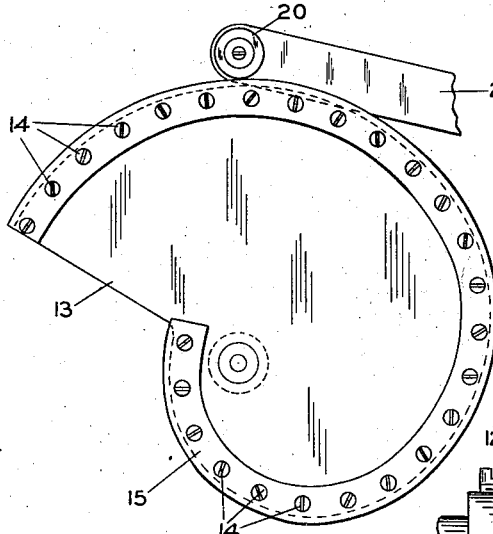

Referring now to Figs. 1 and 2 of the drawing, a hub 10, shown secured to a rotatable supporting shaft 11 by means of a set screw 12, has fixed thereto a scroll-plate or carrier 13 formed of metal or other rigid material having its periphery shaped to a contour similar to that of the desired cam, but of slightly smaller radius at all points than the working radius required of said cam. Clamped to one of the flat faces of the plate 13 by means of a plurality of screws 14, which are adjustably threaded into the same and spaced lengthwise about its edge slightly within its peripheral border, is a tubular member or cam element 15 formed of resiliently yielding elastic material having a smooth outer surface projecting somewhat above the periphery of said scroll-plate 13. While it is not the intention so to restrict the invention, it has been found that a material having characteristics satisfactory for the purposes of the invention is provided in extruded plastic tubing such, for example, as that known under the trade-name of "Saran."

The tubular member 15 constitutes the effective cam element and is positioned around the edge of the scroll-plate 13; and the screws 14 are passed through holes diametrically drilled through said tubing and are threaded into said scroll-plate, whereby they may be screwed in or backed out to any desired degree. The positioning of the tubular member or cam element 15 with respect to the edge of the scroll-plate 13 is such that with the tubing in its normal, fully-expanded condition the outer edge of the curved structure so formed will lie slightly outside the periphery of the said scroll-plate, and will have a profile whose radius is at no point less than the corresponding radius of the scroll-plate.

A roller 20, pivotally journalled on the extremity of a movable arm 21, rests upon the outside surface of the tubular member 15, thereby constituting a cam follower adapted to be deflected by angular motion of the scroll-plate 13 about the axis of rotation of the shaft 11 and to bear to said shaft a radial position relation governed by the radius of the contour formed by the tubular member 15 in contact therewith.

Figures 5, 6:
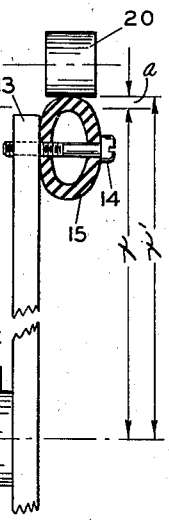
Figs. 5 and 6 are fragmentary views, partially in section, and to an enlarged scale, illustrating the action of the novel cam element utilized.

The method by which adjustment of the profile of the cam formed by said tubular member 15 in conjunction with the scroll-plate 13 is effected will be better understood by reference to Figs. 5 and 6. As indicated in the former figure, the tubular member 15 is mounted upon the plate 13 and held into engagement therewith by means of a plurality of screws 14; and is shown in its normal or undeformed condition having a substantially circular cross-section.

The roller or follower 20, resting upon the outer surface of the tubular cam element 15, will be supported clear of the periphery of the scroll-plate 13 and will be spaced from the axis of rotation of the shaft 11 by a radius designated as "r." In Fig. 6 is shown the condition existing when a screw 14 has been tightened down, by rotating it into the threaded opening provided in the plate 13 to an extent that the material of the tubular cam element 15 is compressed by the head of the screw to a substantially elliptical cross-section. As the distance between the head of the screw 14 and the surface of the plate 13 is thereby decreased, the dimensions of the tubular cam element 15 in a sense parallel to the surface of the plate 13 will be correspondingly increased, so that the roller or follower 20 resting upon the outer surface will now be located at a radius designated "r'" which exceeds the original radius "r" by an increment designated as "a." It will thus be apparent that the operating radius at any point about the periphery of the cam element can be modified by suitably adjusting the screws 14 at that part of the element.

Because of the natural elasticity of extruded plastic tubing, or of any other suitable material, not only will a tightening of the screws 14 tend to increase the effective radius of the cam element at that point, but upon backing out a screw, the tubular material will tend to resume its original circular section, due to its inherent resiliency, with a corresponding decrease in the effective radius of the cam element, as it approaches its original and normal dimensions. By virtue of the continuity and the resilient nature of the tubing, any transitions between adjacent portions of the adjusted cam surface will necessarily be smooth and gradual, and no adjustment within the elastic limit of the material can result in undesirably abrupt transitions between different levels.

Figure 3:
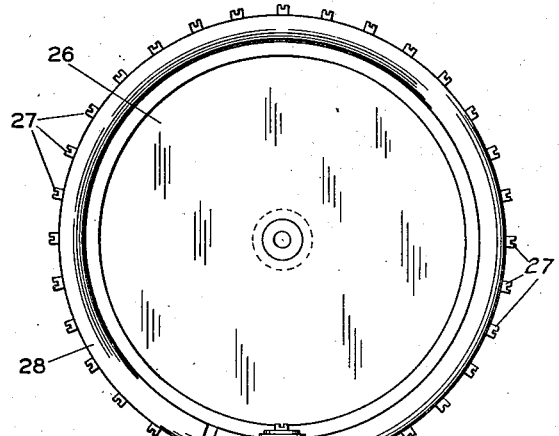
Figs. 3 and 4 are a plan view and a front view, respectively, of a cylindrical cam member embodying the principle of the invention.
Figure 4:
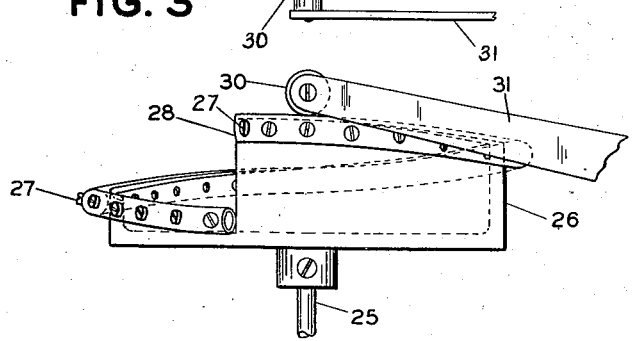

In Figs. 3 and 4 is illustrated the application of the principle of the invention to a cylindrical cam member, adapted to impart to a follower a movement having a component parallel to the rotational axis of the cam. As indicated, there is fixed to a rotatable shaft or spindle 25 a rigid mounting member or carrier 26 having a cylindrical surface coaxial with the axis of rotation of said shaft. An end surface of said mounting member is shaped to a helical conformation similar to the desired shape of the cam in its final form, but extending in an axial sense a lesser distance than the required ultimate cam profile. Attached to the outer cylindrical surface of the member 26 by a plurality of screws 27 radially threaded into said surface along a line lying slightly below the contour of the same, is a section of resilient tubing 28, formed of material similar to that hereinbefore described, and disposed to have its upper surface under normal conditions projecting slightly above the helical contour of the member 26 to provide the cam element. The method of mounting said tubing upon said member is identical with that by which the tubular cam element 15 is attached to the plate 13, Figs. 1 and 2.

A roller 30, pivotally journalled on the extremity of a movable arm 31, rests upon the upper projecting surface of the tubing 28, thereby constituting a cam follower adapted to be deflected in a sense axially of the shaft 25 as the member 26 is rotated therewith. The method of adjustment of the height of individual points of the profile of the cam surface formed by the tubing 28 is identical with that shown in Figs. 5 and 6 and applying to the form of cam element shown in Figs. 1 and 2. As individual screws 27 are tightened into the threaded holes in the member 26, the tubing held thereby will tend to be compressed in a sense radial to the said cylindrical member and will be correspondingly extended in an axial sense, with the result that the surface of the cam element 28 can be elevated at any desired point or points along its contour by tightening said screws, and likewise lowered by backing out the same.

Figure 8:
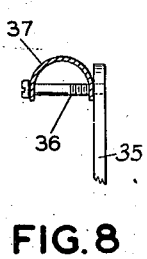
Figs. 8 and 9 are side elevations, partially in section, respectively of two arrangements of the form of cam element structure illustrated in Fig. 7.
Figure 7:
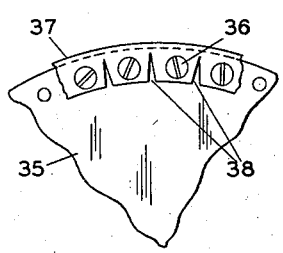
Fig. 7 is a fragmentary front elevation of a portion of an alternative form of structure for a cam element embodying the principle of the invention.

Figs. 7 and 8 are front and side elevations respectively setting forth an alternative construction within the scope of the invention. As indicated, a scroll-plate or carrier 35, similar in all respects to the plate 13 hereinbefore described, forms the basis of a cam member, and has its periphery shaped to a contour similar to the desired profile but of lesser radius. Secured to one of the flat surfaces of the plate 35 by screws 36 threaded thereinto and spaced along a line near the edge of said plate is a member 37 comprising an extended resilient channel formed of thin metal or of other suitable material having the required degree of resiliency and elasticity. This channel member constitutes the cam element and it is of substantially U-section, preferably provided with slits 38 spaced along its open edge to permit bending without buckling, said element being curved to conform substantially to the pre-established contour. The bowed or arched construction of the resilient member 37 provides a convex surface of toroidal curvature, against which surface may rest a follower (not shown) to be positioned thereby as the cam moves in a direction normal to the axis of rotation of said channel 37 constituting the cam element. Tightening of one or more of the screws 36 will tend to decrease the radius of curvature of the bowed section of the channel member, and correspondingly increase the effective radius of the cam element to be engaged; and, conversely, backing out of said screws will tend to decrease said radius as said member returns to its original sectional form under its inherent resiliency.

Figure 9:
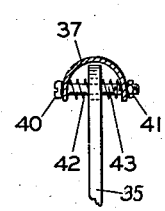

Fig. 9 is a side elevation of an alternative arrangement of the bowed metallic member or cam element 37. In this embodiment, the member 37 is disposed to encircle the edge of the plate 35 and is designed to be retained in position by a plurality of bolts 40 passing through holes drilled near the periphery of the plate as well as through both sides of the channel section or member 37. These bolts threadedly engage nuts 41 which are preferably secured, as by soldering, to the outer surface of one of the sides of said member 37. Small compression springs 42 and 43, encircling the bolts 40, one on each side of the plate 35, serve to maintain the resilient metallic member 37 in a position symmetrical with respect to the plate. Adjustment of the profile of the cam element so formed is effected by tightening or backing out the bolts 40 in the nuts 41; and the general performance of the cam element is identical with the forms hereinbefore described.

The various arrangements set forth provide a simple and effective means whereby considerable adjustment of and variation in a cam profile is possible and with micrometer precision, such adjustment being effected without necessitating dismantling of the cam member or its removal in whole or in part from the instrument or mechanism of which it is an element.

I claim:

1. Motion transmitting means, comprising an extended carrier having a portion movable in a plane, a resilient deformable cam element coextensive with said carrier and supported thereon at a plurality of points, and means to adjust the cam element independently at said points to deform the same simultaneously in senses both parallel to, and normal to, said plane, whereby the adjustment in one of said senses at said points will effect deformation of said cam element in the other of said senses, thereby to modify the cam profile.

2. The motion transmitting means of claim 1, wherein the adjustable means deform the resilient cam element in a sense normal to the direction of travel of the carrier.

3. The motion transmitting means of claim 1, wherein the resilient cam element is attached to a side of the carrier and extends normally beyond its periphery and the adjusting means are adapted to deform the same to vary the degree of projection of the cam element beyond the periphery of such carrier.

4. The motion transmitting means of claim 1, wherein the adjusting means comprise a plurality of screws which also attach the cam element to the carrier.

5. The motion transmitting means of claim 1, wherein the adjusting means comprise a plurality of screws fitting into the carrier and passing through the cam element.

6. The motion transmitting means of claim 1, wherein the adjusting means comprise a plurality of screws fitting into the carrier and passing through the cam element and the heads of the screws are adapted to compress more or less said cam element against the carrier to vary the degree of its deformation.

7. The motion transmitting means of claim 1, wherein the resilient cam element is of toroidal curvature and juxtaposed to the periphery of the carrier and laterally attached thereto at a plurality of points.

8. The motion transmitting means of claim 1, wherein the resilient cam element is in the nature of a tubular member laterally secured to the carrier at a plurality of points.

9. The motion transmitting means of claim 1, wherein the carrier is in the nature of a cylinder to which the cam element is laterally secured at a plurality of points.

10. The motion transmitting means of claim 1, wherein the resilient cam element is channel-shaped and laterally attached along one of its sides to the carrier at a plurality of points.

11. The motion transmitting means of claim 1, wherein the resilient cam element is in the nature of a bowed channel arched over the periphery of the carrier and is attached thereto at a plurality of points.

12. In combination, a cam follower constrained for deflection in a definite direction, a cam member adapted for operative engagement with said follower to define the deflected position of the same and including a carrier, a resilient tubular member laterally secured to said carrier at a plurality of points, and means to adjust the tubular member thereat to varying degrees of compression, whereby said tubular member will be deformed in a sense normal to the direction of said compression to vary the contour of the same for engagement by said follower.

13. In combination, a cam follower constrained for deflection in a definite direction, a cam member for operative engagement with said follower to define the deflected position of the same and including a rigid member adapted for rotation about an axis and having a peripheral portion curved about said axis and shaped to a contour approximating the desired cam profile, a resilient element of toroidal curvature juxtaposed to the periphery of said rigid member, and screws securing the resilient element to the rigid member and adjustable in said rigid member in a sense normal to that of said deflection, whereby the section of said resilient element may be varied more or less from a circular form according to the settings of said screws, a portion of said resilient element projecting more or less beyond said peripheral portion according to the deformation of said resilient member to form an engaging surface for said follower.

14. The combination of claim 13, wherein the rotatable rigid member is adapted for rotation about an axis normal to the direction of deflection of the cam follower.

15. In combination, a cam follower adapted for deflection in a definite direction, a cam member adapted for operative engagement with said follower to define the deflected position of the same and for motion in a sense normal to said direction at the point of engagement with said follower to vary said deflected position, said cam member including a rigid member with a peripheral portion shaped to a contour approximating the desired cam profile, a resilient element having a section of normally cylindrical conformation juxtaposed to the periphery of said member, and screws securing the resilient element to the rigid member and adjustable in said rigid member in a sense normal to both said direction of deflection and sense of motion, whereby to shape said section to a substantially elliptical form departing more or less from a circle according to the adjusted setting of said screws, a portion of said resilient element projecting more or less beyond the peripheral portion of said rigid member, according to the adjustment of said screws, to form an engaging surface for said follower.

JAMES R. HICKS.